(12) United States Patent
Zhou (10) Patent No.: US 12,341,616 B2
(45) Date of Patent: Jun. 24, 2025

(54) DETERMINATION OF HARQ-ACK FEEDBACK OCCASION AND POSITION, AND DEVICE AND MEDIUM

(71) Applicant: BEIJING UNISOC COMMUNICATIONS TECHNOLOGY CO., LTD., Beijing (CN)

(72) Inventor: Huan Zhou, Beijing (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 386 days.

(21) Appl. No.: 17/798,834

(22) PCT Filed: Feb. 5, 2021

(86) PCT No.: PCT/CN2021/075646
§ 371 (c)(1),
(2) Date: Aug. 10, 2022

(87) PCT Pub. No.: WO2021/160047
PCT Pub. Date: Aug. 19, 2021

(65) Prior Publication Data
US 2023/0090792 A1    Mar. 23, 2023

(30) Foreign Application Priority Data
Feb. 12, 2020   (CN) ........................ 202010089136.X (51) Int. Cl.
*H04L 1/1829* (2023.01)
*H04W 72/23* (2023.01)

(52) U.S. Cl.
CPC .......... *H04L 1/1861* (2013.01); *H04L 1/1854* (2013.01); *H04W 72/23* (2023.01)

(58) Field of Classification Search
CPC ............................ H04L 1/1854; H04W 72/23
See application file for complete search history.

(56) References Cited

U.S. PATENT DOCUMENTS

2018/0019843 A1\*  1/2018  Papasakellariou .... H04L 5/0091
2019/0082456 A1    3/2019  Kim et al.
(Continued)

FOREIGN PATENT DOCUMENTS

| CN | 109478978 A | 3/2019 |
|----|-------------|--------|
| CN | 110166181 A | 8/2019 |

(Continued)

OTHER PUBLICATIONS

International Search Report (English and Chinese) and Written Opinion of the International Searching Authority (Chinese) issued in PCT/CN2021/075646, mailed Apr. 27, 2021; ISA/CN.
(Continued)

*Primary Examiner* — Michael A Keller
(74) *Attorney, Agent, or Firm* — Harness, Dickey & Pierce, P.L.C.

(57) ABSTRACT

Disclosed are a method and apparatus for determining an occasion of an HARQ-ACK feedback. The method includes: in response to one DCI scheduling PDSCHs of more than one cell, taking a timeslot in which an end occasion of a PDSCH of one of the scheduled cells is located as a reference timeslot, calculating a timeslot in which an occasion of an HARQ-ACK feedback is located according to the following equation: the timeslot in which the occasion of the HARQ-ACK feedback is located=n+k, where n represents the reference timeslot, and k represents a timeslot offset, indicated in the DCI, between the timeslot in which the occasion of the HARQ-ACK feedback is located and the reference timeslot.

8 Claims, 4 Drawing Sheets

(56) References Cited

U.S. PATENT DOCUMENTS

2019/0230578 A1    7/2019  Karaki et al.
2020/0015258 A1*   1/2020  Zhou .................... H04W 72/23
2021/0211241 A1*   7/2021  Xiong ................... H04L 1/1896

FOREIGN PATENT DOCUMENTS

| CN | 110351016   A  | 10/2019 |
| CN | 110505045   A  | 11/2019 |
| JP | 2015/513873 A  |  5/2015 |
| JP | 2018-050090 A  |  3/2018 |
| WO | 2018/158923 A1 |  9/2018 |

OTHER PUBLICATIONS

Extended European Search Report mailed Jul. 3, 2023, in corresponding European Application No. 21753597.0.
Japanese Office Action regarding Application No. 2022-573793, dated Jan. 9, 2024.

* cited by examiner

DETERMINATION OF HARQ-ACK FEEDBACK OCCASION AND POSITION, AND DEVICE AND MEDIUM

This application is the national phase of International Application No. PCT/CN2021/075646, titled "DETERMINATION OF HARQ-ACK FEEDBACK OCCASION AND POSITION, AND DEVICE AND MEDIUM", filed on Feb. 5, 2021, which claims priority to Chinese Patent Application No. 202010089136.X, titled "DETERMINATION ON OCCASION AND LOCATION OF HARQ-ACK FEEDBACK, DEVICE AND MEDIUM", filed on Feb. 12, 2020 with the China National Intellectual Property Administration (CNIPA), both of which are incorporated herein by reference in their entirety.

FIELD

The present disclosure relates to the field of 5G (5th generation mobile networks, 5th generation mobile networks) communication, and in particular to determination on an occasion and a location of an HARQ-ACK (Hybrid Automatic Repeat request-ACK, Hybrid Automatic Repeat request-ACK) feedback, and a device and a medium.

BACKGROUND

Figure 1:
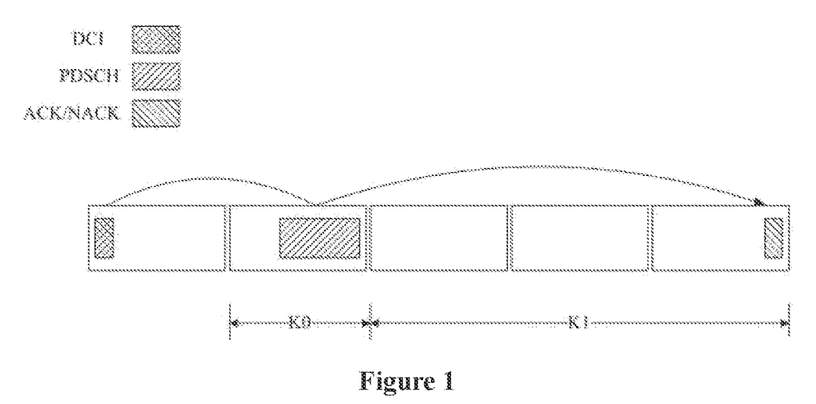
FIG. 1 is a schematic timing indication diagram of a downlink data scheduling according to the conventional technology.

In 5G NR (New Radio, New Radio), a PDSCH (Physical Downlink Shared Channel, Physical Downlink Shared Channel) is used to transmit downlink data, a PDCCH (Physical Downlink Control Channel, Physical Downlink Control Channel) is used to transmit DCI (Downlink Control Information, Downlink Control Information). Previously, it is specified in NR that one DCI schedules a PDSCH of only one cell. Reference may be made to FIG. 1 in determining an occasion of an HARQ-ACK feedback corresponding to the PDSCH.

In FIG. 1, the units of K0 and K1 in timeslots (slot), where K0 represents a time interval between a PDSCH and a PDCCH, and K1 represents a time interval between an HARQ-ACK feedback and the PDSCH. The occasion of the HARQ-ACK feedback corresponding to the PDSCH is determined as an end occasion of the PDSCH plus K1.

Currently, NR is decided to support that one DCI schedules PDSCHs of at most two cells. How to determine an occasion of an HARQ-ACK feedback in such situation becomes an urgent problem to be solved at present.

In addition, an NR dynamic HARQ-ACK codebook is determined based on a counter DAI (Downlink Assignment Indicator, Downlink Assignment Indicator) and a total DAI (total DAI). For a certain PUCCH (Physical Uplink Control Channel, Physical Uplink Control Channel), the total DAI in NR indicates a total quantity of DCIS sent by base stations of all cells from a first DAI occasion to a current DAI occasion within a set of PDCCH listening occasions. The counter DAI indicates a sum of a cumulative count of DCIS from a first cell to a current cell sent by base stations at the current DAI occasion and a total DAI corresponding to a previous DAI occasion, within the set of PDCCH listening occasions.

The counter DAI is counted according to a cell number from small to large at a same DAI occasion.

Indications in the DCI are shown in the following table as an example. It is assumed that six cells are configured, and values of the counter DAI and the total DAI obtained at three PDCCH monitoring occasions are shown in the following table.

| Cell | Counter DAI/Total DAI | | |
|---|---|---|---|
| | Occasion 0 | Occasion 1 | Occasion 2 |
| 1 | 1/2 | | |
| 2 | 2/2 | 3/2 | |
| 3 | 3/2 | 4/2 | |
| 4 | 4/2 | | 3/3 |
| 5 | 1/2 | 1/2 | |
| 6 | 2/2 | 2/2 | |

The above method for calculating the counter DAI and the total DAI can be implemented only in a case that PDSCH of one cell is scheduled by one DCI. Another urgent problem to be solved is how to calculate the counter DAI and the total DAI in a case that PDSCHs of more than one cell are scheduled by one DCI, and thereby determine a location of an HARQ-ACK.

SUMMARY

The present disclosure intends to solve the problem in the conventional technology that an occasion of an HARQ-ACK feedback cannot be determined and a location of an HARQ-ACK cannot be determined in a dynamic codebook in a case that one DCI schedules PDSCHs of more than one cell. Therefore, a method and apparatus for determining an occasion of an HARQ-ACK feedback and a location of an HARQ-ACK, and a device and a medium are provided in the present disclosure.

The following technical solutions are provided in the present disclosure to solve the technical problem.

A method for determining an occasion of an HARQ-ACK feedback is provided according to an embodiment of the present disclosure. The method includes:

in response to one DCI scheduling PDSCHs of more than one cell, taking a timeslot in which an end occasion of a PDSCH of one of the scheduled cells is located as a reference timeslot, calculating a timeslot in which an occasion of an HARQ-ACK feedback is located according to the following equation:

the timeslot in which the occasion of the HARQ-ACK feedback is located=$n+k$, where n represents the reference timeslot, and k represents a timeslot offset, indicated in the DCI, between the timeslot in which the occasion of the HARQ-ACK feedback is located and the reference timeslot.

In an embodiment, the reference timeslot is:

a timeslot in which an end occasion of a PDSCH of a cell with a smallest serving cell ID among the scheduled cells is located; or a timeslot in which an end occasion of a PDSCH of a cell with a smallest carrier indicator flag among the scheduled cells is located; or a timeslot in which an end occasion of a PDSCH of a cell configured by a high-level signaling as a reference cell among the scheduled cells is located; or a timeslot in which an end occasion of a PDSCH ending latest among PDSCHs of the scheduled cells is located, in a case that end occasions of the PDSCHs of the scheduled cells are located at different timeslots; or a timeslot in which an end occasion of PDSCHs ending simultaneously among the PDSCHs of the schedules cells is located, in a case that end occasions of the PDSCHs of the scheduled cells are located at a same timeslot.

In an embodiment, a total quantity of the cells scheduled by the DCI is two.

A method for determining an occasion of an HARQ-ACK feedback is provided according to an embodiment of the present disclosure. The method includes:

in response to one DCI scheduling PDSCHs of more than one cell, calculating, for each cell, a timeslot in which an occasion of an HARQ-ACK feedback corresponding to a PDSCH of the cell is located according to the following equation:

the timeslot in which the occasion of the HARQ-ACK feedback is located=$n_i+k$, where $n_i$ represents a timeslot in which an end occasion of a PDSCH of an i-th cell is located, and k represents a timeslot offset, indicated in the DCI, between the timeslot in which the occasion of the HARQ-ACK feedback is located and a timeslot in which an end occasion of a PDSCH corresponding to the HARQ-ACK feedback is located.

In an embodiment, a total quantity of the cells scheduled by the DCI is two.

A method for determining a location of an HARQ-ACK in a dynamic codebook is provided according to an embodiment of the present disclosure. The method includes:

in response to one DCI scheduling a PDSCH of at least one cell, calculating a counter DAI according to the following equation:

the counter DAI=a counter DAI in a DCI previous to the current DCI+a total quantity of the scheduled cells.

In an embodiment, the method further includes:
in response to the DCI scheduling the PDSCH of the at least one cell, calculating a total DAI according to the following equation:

the total DAI=a total DAI in the DCI previous to the current DCI+the total quantity of the scheduled cells.

In an embodiment, the method further includes:
if the DCI schedules a PDSCH of one cell, disposing an HARQ-ACK corresponding to the PDSCH of the cell at a location of a DAI count in the counter DAI.

In an embodiment, the method further includes:
if the DCI schedules PDSCHs of more than one cell, sorting the scheduled cells according to a preset rule, and disposing HARQ-ACKs corresponding to the PDSCHs of the sorted cells at locations of DAI counts sequentially from a first DAI count to a last DAI count in the counter DAI, respectively.

In an embodiment, the preset rule includes:
the scheduled cells are sorted according to serving cell IDs of the cells from small to large; or
the scheduled cells are sorted according to carrier indicator flags of the cells from small to large; or
a reference cell configured by a high-level signaling is given priority.

In an embodiment, if the DCI schedules the PDSCHs of more than one cell, the scheduled cells have a same CBG configuration; and/or a total quantity of the cells scheduled by the DCI is 2.

A method for determining a location of an HARQ-ACK in a dynamic codebook is provided according to an embodiment of the present disclosure. The method includes:

in response to one DCI scheduling a PDSCH of at least one cell, calculating a counter DAI according to the following equation:

the counter DAI=a counter DAI in a DCI previous to a current DCI+1.

In an embodiment, the method further includes:
in response to the DCI scheduling the PDSCH of the at least one cell, calculating a total DAI according to the following equation:

the total DAI=a total DAI in the DCI previous to the current DCI+1.

In an embodiment, the method further includes:
if the DCI schedules a PDSCH of one cell, disposing an HARQ-ACK corresponding to the PDSCH of the cell at a location of a DAI count of the counter DAI; or
if the DCI schedules PDSCHs of two cells, performing an XOR operation on HARQ-ACKs corresponding to the PDSCHs of the two cells to generate an HARQ-ACK occupying one position, and disposing the generated HARQ-ACK at a location of a DAI count of the counter DAI.

In an embodiment, if the DCI schedules PDSCHs of two cells, the scheduled cells have a same CBG configuration.

An apparatus for determining an occasion of an HARQ-ACK feedback is provided according to an embodiment of the present disclosure. The apparatus includes: a first determination module. The first determination module is configured to:

in response to one DCI scheduling PDSCHs of more than one cell, taking a timeslot in which an end occasion of a PDSCH of one of the scheduled cells is located as a reference timeslot, calculate a timeslot in which an occasion of an HARQ-ACK feedback is located according to the following equation:

the timeslot in which the occasion of the HARQ-ACK feedback is located=$n+k$, where n represents the reference timeslot, and k represents a timeslot offset, indicated in the DCI, between the timeslot in which the occasion of the HARQ-ACK feedback is located and the reference timeslot.

In an embodiment, the reference timeslot is:
a timeslot in which an end occasion of a PDSCH of a cell with a smallest serving cell ID among the scheduled cells is located; or
a timeslot in which an end occasion of a PDSCH of a cell with a smallest carrier indicator flag among the scheduled cells is located; or
a timeslot in which an end occasion of a PDSCH of a cell configured by a high-level signaling as a reference cell among the scheduled cells is located; or
a timeslot in which an end occasion of a PDSCH ending latest among PDSCHs of the scheduled cells is located, in a case that end occasions of the PDSCHs of the scheduled cells are located at different timeslots; or
a timeslot in which an end occasion of PDSCHs ending simultaneously among the PDSCHs of the schedules cells is located, in a case that end occasions of the PDSCHs of the scheduled cells are located at a same timeslot.

In an embodiment, a total quantity of the cells scheduled by the DCI is two.

An apparatus for determining an occasion of an HARQ-ACK feedback is provided according to an embodiment of the present disclosure. The apparatus includes a second determination module. The second determination module is configured to:

in response to one DCI scheduling PDSCHs of more than one cell, calculate, for each cell, a timeslot in which an occasion of an HARQ-ACK feedback corresponding to a PDSCH of the cell is located according to the following equation:

the timeslot in which the occasion of the HARQ-ACK feedback is located=$n_i$+k, where $n_i$ represents a timeslot in which an end occasion of a PDSCH of an i-th cell is located, and k represents a timeslot offset, indicated in the DCI, between the timeslot in which the occasion of the HARQ-ACK feedback is located and a timeslot in which an end occasion of a PDSCH corresponding to the HARQ-ACK feedback is located.

In an embodiment, a total quantity of the cells scheduled by the DCI is two.

An apparatus for determining a location of an HARQ-ACK in a dynamic codebook is provided according to an embodiment of the present disclosure. The apparatus includes a counter DAI determination module. The counter DAI determination module is configured to:

in response to one DCI scheduling a PDSCH of at least one cell, calculate a counter DAI according to the following equation:

the counter DAI=a counter DAI in a DCI previous to the current DCI+a total quantity of the scheduled cells.

In an embodiment, the apparatus further includes a total DAI determination module. The total DAI determination module is configured to:

in response to the DCI scheduling the PDSCH of the at least one cell, calculate a total DAI according to the following equation:

the total DAI=a total DAI in the DCI previous to the current DCI+the total quantity of the scheduled cells.

In an embodiment, if the DCI schedules a PDSCH of one cell, the counter DAI determination module is further configured to: dispose an HARQ-ACK corresponding to the PDSCH of the cell at a location of a DAI count in the counter DAI.

In an embodiment, if the DCI schedules PDSCHs of more than one cell, the counter DAI determination module is further configured to: sort the scheduled cells according to a preset rule, and dispose HARQ-ACKs corresponding to the PDSCHs of the sorted cells at locations of DAI counts sequentially from a first DAI count to a last DAI count in the counter DAI, respectively.

In an embodiment, the preset rule includes:
the scheduled cells are sorted according to serving cell IDs of the cells from small to large; or
the scheduled cells are sorted according to carrier indicator flags of the cells from small to large; or
a reference cell configured by a high-level signaling is given priority.

In an embodiment, if the DCI schedules the PDSCHs of more than one cell, the scheduled cells have a same CBG configuration; and/or a total quantity of the cells scheduled by the DCI is 2.

An apparatus for determining a location of an HARQ-ACK in a dynamic codebook is provided according to an embodiment of the present disclosure. The apparatus includes a counter DAI determination module. The counter DAI determination module is configured to:

in response to one DCI scheduling a PDSCH of at least one cell, calculate a counter DAI according to the following equation:

the counter DAI=a counter DAI in a DCI previous to a current DCI+1.

In an embodiment, the apparatus further includes a total DAI determination module. The total DAI determination module is configured to:

in response to the DCI scheduling the PDSCH of the at least one cell, calculate a total DAI according to the following equation:

the total DAI=a total DAI in the DCI previous to the current DCI+1.

In an embodiment, the counter DAI determination module is further configured to:
if the DCI schedules a PDSCH of one cell, dispose an HARQ-ACK corresponding to the PDSCH of the cell at a location of a DAI count in the counter DAI; or
if the DCI schedules PDSCHs of two cells, perform an XOR operation on HARQ-ACKs corresponding to the PDSCHs of the two cells to generate an HARQ-ACK occupying one position, and dispose the generated HARQ-ACK at a location of a DAI count of the counter DAI.

In an embodiment, if the DCI schedules PDSCHs of two cells, the scheduled cells have a same CBG configuration.

User equipment is provided according to an embodiment of the present disclosure. The user equipment is configured to:
provide an HARQ-ACK feedback at a timeslot in which an occasion of the HARQ-ACK feedback is located, the timeslot being calculated by the above method or by the above apparatus; and/or
transmit an HARQ-ACK, the HARQ-ACK being located, in a dynamic codebook, at a location determined by the above method or by the above apparatus.

An electronic device is provided according to an embodiment of the present disclosure. The electronic device includes: a memory, a processor, and a computer program stored in the memory and executable on the processor. The processor, when executing the computer program, implements the method as above.

A computer-readable storage medium storing a computer program is provided according to an embodiment of the present disclosure. The computer program, when executed by a processor, causes steps of the above method to be implemented.

The above-mentioned features may be combined on the basis of conforming to common knowledge in the art, so as to obtain preferred embodiments of the present disclosure.

The present disclosure has the following advantageous effect. With the present disclosure, the problem in the conventional technology that an occasion of an HARQ-ACK feedback cannot be determined in a case that one DCI schedules PDSCHs of more than one cell is solved, and one PUCCH can simultaneously feed back multiple HARQ-ACKs corresponding to more than one PDSCHs scheduled by one DCI. Furthermore, the present disclosure provides a new method for calculating a counter DAI and a total DAI, and provides a specific solution for determining a location of an HARQ-ACK in a dynamic codebook based on the new method, especially a solution for feeding back, in the dynamic codebook, locations of HARQ-ACKs corresponding to PDSCHs of two cells scheduled by one DCI. The solution can simplify a high-level signaling configuration, without additional dynamic signaling interaction.

DETAILED DESCRIPTION

Hereinafter the present disclosure is described in embodiments, but the present disclosure is not limited to be within the scope of the described embodiments.

It should be noted that an execution subject of the method for determining an occasion of an HARQ-ACK feedback described in embodiments of the present disclosure may be a separate chip, chip module, or UE, or may be a chip or chip module integrated in a UE. The execution subject of the method for determining a location of an HARQ-ACK in a dynamic codebook described in embodiments of the present disclosure may be a separate chip, chip module, or UE, or may be a chip or chip module integrated in a UE.

The apparatus for determining an occasion of an HARQ-ACK feedback described in embodiments of the present disclosure may specifically be a separate chip, chip module or UE, or may be a chip or chip module integrated in a UE. Each module/unit contained in the apparatus for determining an occasion of an HARQ-ACK feedback may be a software module/unit, or a hardware module/unit, or a part of modules/units may be a software module/unit and another part of modules/units may be a hardware module/unit. For example, for each device and product applied to or integrated in a chip, each of modules/units included therein may be implemented by hardware such as a circuit. Alternatively, at least some of the modules/units may be implemented by a software program running on a processor integrated in the chip, and the remaining ones of the modules/units may be implemented by hardware such as a circuit. For each device and product applied to or integrated in a chip module, each of modules/units included therein may be all implemented by hardware such as a circuit, and different modules/units may be located in a same component (such as a chip, a circuit module, or the like) or in different components of the chip module. Alternatively, at least some of the modules/units may be implemented by a software program running on a processor integrated in the chip module, and the remaining ones of the modules/units may be implemented by hardware such as a circuit. For each device and product applied to or integrated in a UE, each of modules/units included therein may be all implemented by hardware such as a circuit, and different modules/units may be located in a same component (such as a chip, a circuit module, or the like) or in different components in the terminal. Alternatively, at least some of the modules/units may be implemented by a software program running on a processor integrated in the UE, and the remaining ones of the modules/units may be implemented by hardware such as a circuit.

The apparatus for determining a location of an HARQ-ACK feedback in a dynamitic codebook described in embodiments of the present disclosure may specifically be a separate chip, chip module or UE, or may be a chip or chip module integrated in a UE. Each module/unit contained in the apparatus for determining a location of an HARQ-ACK feedback in a dynamitic codebook may be a software module/unit, or a hardware module/unit, or a part of modules/units may be a software module/unit and another part of modules/units may be a hardware module/unit. For example, for each device and product applied to or integrated in a chip, each of modules/units included therein may be implemented by hardware such as a circuit. Alternatively, at least some of the modules/units may be implemented by a software program running on a processor integrated in the chip, and the remaining ones of the modules/units may be implemented by hardware such as a circuit. For each device and product applied to or integrated in a chip module, each of modules/units included therein may be implemented by hardware such as a circuit, and different modules/units may be located in a same component (such as a chip, a circuit module, or the like) or in different components of the chip module. Alternatively, at least some of the modules/units may be implemented by a software program running on a processor integrated in the chip module, and the remaining ones of the modules/units may be implemented by hardware such as a circuit. For each device and product applied to or integrated in a UE, each of modules/units included therein may be implemented by hardware such as a circuit, and different modules/units may be located in a same component (such as a chip, a circuit module, or the like) or in different components in the terminal. Alternatively, at least some of the modules/units may be implemented by a software program running on a processor integrated in the UE, and the remaining ones of the modules/units may be implemented by hardware such as a circuit.

First Embodiment

A method for determining an occasion of an HARQ-ACK feedback is provided in a first embodiment. The method includes the following steps.

In response to one DCI scheduling PDSCHs of more than one cell, a timeslot in which an end occasion of a PDSCH of one of the scheduled cells is located is taken as a reference timeslot, and a timeslot in which an occasion of an HARQ-ACK feedback is located is calculated according to the following equation:

the timeslot in which the occasion of the HARQ-ACK feedback is located=$n+k$.

In the above equation, n represents the reference timeslot, and k represents a timeslot offset, indicated in the DCI, between the timeslot in which the occasion of the HARQ-ACK feedback is located and the reference timeslot.

As an example, a total quantity of the cells scheduled by the DCI may be 2.

In a first situation of the first embodiment, the reference timeslot may be a timeslot in which an end occasion of a PDSCH of a cell with a smallest serving cell ID among the scheduled cells is located. The method is further illustrated through an example below.

Figure 2:
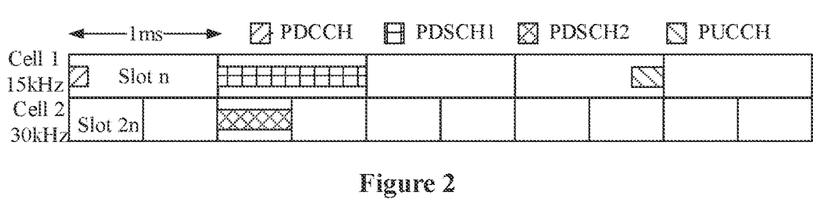
FIG. 2 is a schematic diagram of transmission timing in a first situation according a first embodiment of the present disclosure.

As shown in FIG. 2, a DCI is transmitted by a base station in a PDCCH at Slot n, and the DCI schedules PDSCHs (PDSCH1, PDSCH2) of two cells (cell1, cell2). It is assumed that the DCI indicates a timeslot offset k1 between a timeslot in which the occasion of an HARQ-ACK feedback is located and a timeslot in which a PDSCH is located is equal to 2 (i.e., k1=2), and a subcarrier spacing of PUCCH is the same as a subcarrier spacing of the cell 1.

In a case that the serving cell ID of cell 1 is 245 and the serving cell ID of cell 2 is 345, the timeslot Slot n+1 in which the end occasion of PDSCH1 is located is taken as the reference timeslot, and thus the timeslot in which the occasion of the HARQ-ACK feedback is located is calculated as Slot n+3. That is, user equipment performs the HARQ-ACK feedback within the Slot n+3 with the subcarrier spacing of PUCCH as granularity.

In a second situation of the first embodiment, considering that a cell with a smaller Carrier Indicator Flag (Carrier Indicator Flag, CIF) is usually a more important secondary carrier, thus the reference timeslot may be a timeslot in which an end occasion of a PDSCH of a cell with a smallest carrier indicator flag among the scheduled cells is located. The method is further illustrated through an example below.

Also as shown in FIG. 2, a DCI is transmitted by the base station in the PDCCH at Slot n, and the DCI schedules PDSCHs (PDSCH1, PDSCH2) of two cells (cell1, cell2). It is assumed that the DCI indicates a timeslot offset k1 between a timeslot in which the occasion of an HARQ-ACK feedback is located and a timeslot in which a PDSCH is located is equal to 2 (i.e., k1=2), and a subcarrier spacing of PUCCH is the same as a subcarrier spacing of the cell 1.

In a case that the CIF of cell 1 is 0, and the CIF of cell 2 is 3, the timeslot Slot n+1 in which the end occasion of PDSCH1 is located is taken as the reference timeslot, and thus the timeslot in which the occasion of the HARQ-ACK feedback is located is calculated as Slot n+3. That is, the user equipment performs HARQ-ACK feedback within the Slot n+3 with the subcarrier spacing of PUCCH as granularity.

In a third situation of the first embodiment, the reference timeslot may be a timeslot in which an end occasion of a PDSCH of a cell configured by a high-level signaling as a reference cell among the scheduled cells is located. The high-level signaling may include an RRC (Radio Resource Control, Radio Resource Control) signaling. The method is further illustrated through an example below.

Also as shown in FIG. 2, a DCI is transmitted by the base station in the PDCCH at Slot n, and the DCI schedules PDSCHs (PDSCH1, PDSCH2) of two cells (cell1, cell2). It is assumed that the DCI indicates a timeslot offset k1 between a timeslot in which the occasion of an HARQ-ACK feedback is located and the reference timeslot is equal to 2 (i.e., k1=2), and a subcarrier spacing of PUCCH is the same as a subcarrier spacing of the cell 1.

In a case that cell 1 is configured by a high-level signaling as a reference cell during a multi-cell (cell 1, cell 2) scheduling, the timeslot Slot n+1 in which the end occasion of the PDSCH of cell 1 is located is taken as the reference timeslot, and thus the timeslot in which the occasion of the HARQ-ACK feedback is located is calculated as Slot n+3. That is, the user equipment performs HARQ-ACK feedback within the Slot n+3 with the subcarrier spacing of PUCCH as granularity.

In a fourth situation of the first embodiment, in order to easily determine the feedback occasion and avoid a problem of insufficient processing time, the reference timeslot may be determined as: a timeslot in which an end occasion of a PDSCH ending latest among PDSCHs of the scheduled cells is located, in a case that end occasions of the PDSCHs of the scheduled cells are located at different timeslots, or a timeslot in which an end occasion of PDSCHs ending simultaneously among the PDSCHs of the schedules cells is located, in a case that end occasions of the PDSCHs of the scheduled cells are located at a same timeslot. The method is further illustrated through an example below.

The DCI is transmitted by the base station in the PDCCH at Slot n, and the DCI schedules PDSCHs (PDSCH1, PDSCH2) of two cells (cell1, cell2). It is assumed that the DCI indicates a timeslot offset k1 between a timeslot in which the occasion of an HARQ-ACK feedback is located and the reference timeslot is equal to 2 (i.e., k1=2), and a subcarrier spacing of PUCCH is the same as a subcarrier spacing of the cell 1.

Reference is made to FIG. 2 for an example. The PDSCH1 ends later than the PDSCH2, and thus the timeslot Slot n+1 in which the end occasion of the PDSCH1 is located is taken as the reference timeslot. Hence, the timeslot in which the occasion of the HARQ-ACK feedback is located is calculated as Slot n+3. That is, the user equipment performs the HARQ-ACK feedback within Slot n+3 with the subcarrier spacing of PUCCH as granularity.

Figure 3:
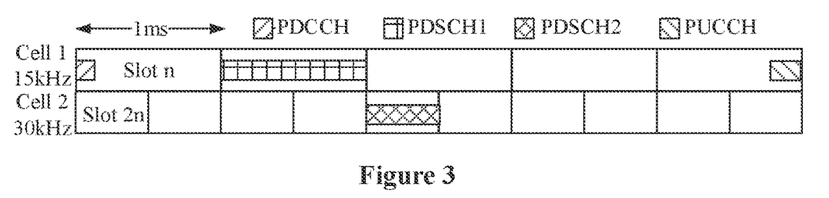
FIG. 3 is a schematic diagram of transmission timing in a case that an end position of PDSCH2 is after an end position of PDSCH1 in a fourth situation according to the first embodiment of the present disclosure.

Reference is made to FIG. 3 for another example. The PDSCH2 ends later than the PDSCH1, and thus the timeslot Slot n+2 in which the end occasion of the PDSCH2 is located is taken as the reference timeslot. Hence, the timeslot in which the occasion of the HARQ-ACK feedback is located is calculated as Slot n+4. That is, the user equipment performs the HARQ-ACK feedback within Slot n+4 with the subcarrier spacing of PUCCH as granularity.

Figure 4:
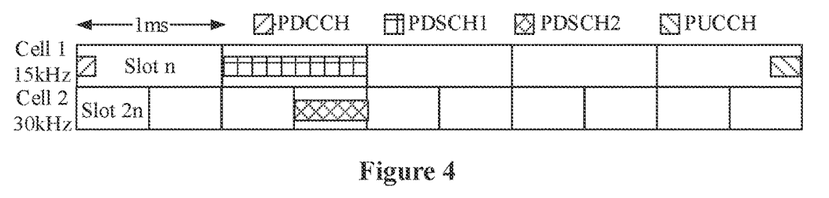
FIG. 4 is a schematic diagram of transmission timing in a case that an end position of PDSCH1 is the same as an end position of PDSCH2 in the fourth situation according to the first embodiment of the present disclosure.

Reference is made to FIG. 4 for yet another example. The PDSCH1 and the PDSCH2 end at a same location (i.e., Slot n+1), and thus the Slot n+1 is taken as the reference timeslot. Hence, the timeslot in which the occasion of the HARQ-ACK feedback is located is calculated as Slot n+3. That is, the user equipment performs the HARQ-ACK feedback within Slot n+3 with the subcarrier spacing of PUCCH as granularity.

The methods in the above embodiment cures the deficiency in the conventional technology that an occasion of an HARQ-ACK feedback cannot be determined in a case that one DCI schedules PDSCHs of more than one cell, and can support that one PUCCH simultaneously feed back multiple HARQ-ACKs corresponding to more than one PDSCH scheduled by one DCI.

Second Embodiment

A method for determining an occasion of an HARQ-ACK feedback is provided in a second embodiment. The method includes the following step.

In response to one DCI scheduling PDSCHs of more than one cell, it is calculated, for each cell, a timeslot in which an occasion of an HARQ-ACK feedback corresponding to a PDSCH of the cell is located according to the following equation:

the timeslot in which the occasion of the HARQ-ACK feedback is located=$n_i+k$.

In the above equation, $n_i$ represents a timeslot in which an end occasion of a PDSCH of an i-th cell is located, and k represents a timeslot offset, indicated in the DCI, between the timeslot in which the occasion of the HARQ-ACK feedback is located and a timeslot in which an end occasion of a PDSCH corresponding to the HARQ-ACK feedback is located, where i is a positive integer less than or equal to a total quantity of the cells scheduled by the DCI.

As an example, the total quantity of cells scheduled by the DCI is 2.

The method is further illustrated through an example below.

A DCI is transmitted by a base station in a PDCCH at Slot n, and the DCI schedules PDSCHs (PDSCH1, PDSCH2) of two cells (cell1, cell2). It is assumed that the DCI indicates a timeslot offset k1 between a timeslot in which the occasion of an HARQ-ACK feedback is located and a timeslot in which a PDSCH is located is equal to 2 (i.e., k1=2), and a subcarrier spacing of PUCCH is the same as a subcarrier spacing of the cell 1.

Figure 5:
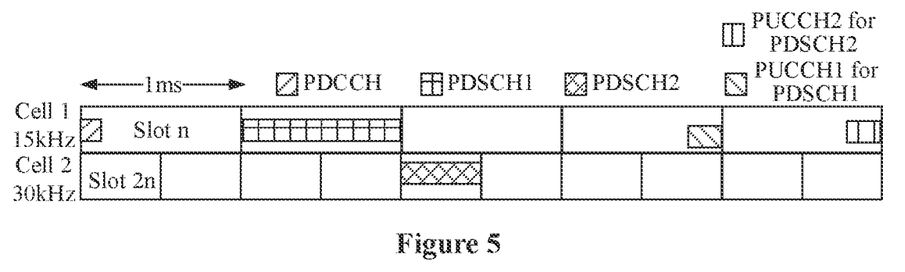
FIG. 5 is a schematic diagram of transmission timing in a situation according to a second embodiment of the present disclosure.

As shown in FIG. 5, the end occasion of the PDSCH1 is located in the timeslot Slot n+1, and the end occasion of the PDSCH2 is located in the timeslot Slot n+2. Hence, the timeslot in which the occasion of the HARQ-ACK feedback corresponding to the PDSCH1 is located is Slot n+3, and the timeslot in which the occasion of the HARQ-ACK feedback corresponding to the PDSCH2 is located is Slot n+4. That is, user equipment performs HARQ-ACK feedback corresponding to the PDSCH1 within the Slot n+3 with a subcarrier spacing of the PUCCH1 as granularity, and performs HARQ-ACK feedback corresponding to the PDSCH2 within the Slot n+4 with a carrier spacing of the PUCCH2 as the granularity.

The present disclosure cures the deficiency in the conventional technology that an occasion of an HARQ-ACK feedback cannot be determined in a case that one DCI schedules PDSCHs of more than one cell, and can support that one PUCCH simultaneously feed back multiple HARQ-ACKs corresponding to more than one PDSCH scheduled by one DCI.

Third Embodiment

A method for determining a location of an HARQ-ACK in a dynamic codebook is provided in an embodiment. The method includes the following step.

In response to one DCI scheduling a PDSCH of at least one cell, a counter DAI and a total DAI are calculated according to the following equations:

the counter DAI=a counter DAI in a DCI previous to the current DCI+a total quantity of the scheduled cells, the total DAI=a total DAI in the DCI previous to the current DCI+the total quantity of the scheduled cells.

In a case that the DCI schedules a PDSCH of one cell, then the counter DAI and the total DAI are calculated according to the following equations:

the counter DAI=a counter DAI in a DCI previous to a current DCI+1;

the total DAI=a total DAI in the DCI previous to the current DCI+1.

In this case, the method further includes the following step. An HARQ-ACK corresponding to the PDSCH of the cell is disposed at a location of a DAI count in the counter DAI.

In a case that the DCI schedules PDSCHs of more than one cell, the method further includes the following step.

The scheduled cells are sorted according to a preset rule, and HARQ-ACKs corresponding to the PDSCHs of the sorted cells are disposed at locations of DAI counts sequentially from a first DAI count to a last DAI count in the counter DAI, respectively.

The preset rules may include:
- the scheduled cells are sorted according to serving cell IDs of the cells from small to large; or
- the scheduled cells are sorted according to carrier indicator flags of the cells from small to large; or
- a reference cell configured by a high-level signaling is given priority, which means the cell configured by a high-level signaling as the reference cell is at the first place.

In an example, the scheduled cells may have a same CBG (Code Block Group) configuration.

In an example, a total quantity of the cells scheduled by the DCI may be 2.

If the DCI schedules PDSCHs of two cells, and scheduled two cells have a same CBG configuration, then the counter DAI and the total DAI may be calculated according to the following equations:

the counter DAI=a counter DAI in a DCI previous to a current DCI+2;

the total DAI=a total DAI in the DCI previous to the current DCI+2.

The scheduled cells are sorted according to the preset rule, and HARQ-ACKs corresponding to the PDSCHs of the sorted cells are disposed at locations of DAI counts sequentially from the first DAI count to the last DAI count in the counter DAI, respectively. This step may specifically include any one of the following cases.

In a first case, the scheduled cells are sored according to serving cell IDs of the cells from small to large. Specifically, an HARQ-ACK corresponding to a PDSCH of a cell with a smaller serving cell ID in the two cells is disposed at a location of the first DAI count in the counter DAI, and an HARQ-ACK corresponding to a PDSCH of a cell with a larger serving cell ID in the two cells is disposed at a location of the second DAI count in the counter DAI.

In a second case, the scheduled cells are sored according to carrier indicator flags of the cells from small to large. Specifically, an HARQ-ACK corresponding to a PDSCH of a cell with a smaller carrier indicator flag in the two cells is disposed in a location of the first DAI count in the counter DAI, and an HARQ-ACK corresponding to a PDSCH of a cell with a larger carrier indicator flag is disposed at a location of the second DAI count in the counter DAI.

In a third case, a reference cell configured by a high-level signaling is given priority. Specifically, an HARQ-ACK corresponding to a PDSCH of a cell configured by the high-level signaling as the reference cell in the two cells is disposed at a location of the first DAI count in the counter DAI, and an HARQ-ACK corresponding to a PDSCH of a cell not configured by the high-level signaling as the reference cell in the two cells is disposed at a location of the second DAI count in the counter DAI. The high-level signaling may include an RRC signaling.

An example is given below to further illustrate the above method.

Actual DAI in a case of carrier aggregation is shown in the table below. The actual DAI shown in the table is not same as what is indicated in the DCI which is calculated by performing modulo 4 operation on an actual value. The DAI suffixed with (2) in the table indicates that the DCI schedules PDSCHs of two cells. Serving cell IDs of the two cells are 234 and 345, respectively. CIFs of the two cells are 0 and 3, respectively.

| | Counter DAI/Total DAI | | |
|---|---|---|---|
| Cell | Occasion 0 | Occasion 1 | Occasion 2 |
| 1 | 2/6 (2) | 8/10 (2) | |
| 2 | 3/6 | | |
| 3 | 4/6 | | 11/11 |
| 4 | 5/6 | 9/10 | |
| 5 | 6/6 | 10/10 | |

Based on the table, in the above first case that the scheduled cells are sored according to serving cell IDs of the cells from small to large, locations of HARQ-ACKs corresponding to PDSCHs of the two cells may be determined as follows.

Within the occasion 0, the HARQ-ACK corresponding to the PDSCH of the cell 1 is disposed at a location of the first DAI count of the counter DAI (=1), that is, the first HARQ-ACK position; and the HARQ-ACK corresponding to the PDSCH of the cell 2 is disposed at a location of the second DAI count of the counter DAI (=2), that is, the second HARQ-ACK position. Within the occasion 1, the HARQ-ACK corresponding to PDSCH of the cell 1 is disposed at a location of the first DAI count of the counter DAI (=7), that is, the seventh HARQ-ACK position; and the HARQ-ACK corresponding to PDSCH of the cell 2 is disposed at a location of the second DAI count of the counter DAI (=8), that is, the eighth HARQ-ACK position.

Also based on the table, in the above second case that the scheduled cells are sored according to carrier indicator flags of the cells from small to large, locations of HARQ-ACKs corresponding to PDSCHs of the two cells may be determined as follows.

Within the occasion 0, the HARQ-ACK corresponding to the PDSCH of the cell 1 is disposed at a location of the first DAI count of the counter DAI equal to 1, that is, the first HARQ-ACK position; and the HARQ-ACK corresponding to the PDSCH of the cell 2 is disposed at a location of the second DAI count of the counter DAI equal to 2, that is, the second HARQ-ACK position. Within the occasion 1, the HARQ-ACK corresponding to PDSCH of the cell 1 is disposed at a location of the first DAI count of the counter DAI equal to 7, that is, the seventh HARQ-ACK position; and the HARQ-ACK corresponding to PDSCH of the cell 2 is disposed at a location of the second DAI count of the counter DAI equal to 8, that is, the eighth HARQ-ACK position.

Based on the table, in the above third case that a reference cell configured by a high-level signaling is given priority, locations of HARQ-ACKs corresponding to PDSCHs of the two cells may be determined as follows.

If the cell 1 is configured by a high-level signaling as the reference cell, within the occasion 0, the HARQ-ACK corresponding to the PDSCH of the cell 1 is disposed at a location of the first DAI count of the counter DAI equal to 1, that is, the first HARQ-ACK position, and the HARQ-ACK corresponding to the PDSCH of the cell 2 is disposed at a location of the second DAI count of the counter DAI equal to 2, that is, the second HARQ-ACK position; within the occasion 1, the HARQ-ACK corresponding to PDSCH of the cell 1 is disposed at a location of the first DAI count of the counter DAI equal to 7, that is, the seventh HARQ-ACK position, and the HARQ-ACK corresponding to PDSCH of the cell 2 is disposed at a location of the second DAI count of the counter DAI equal to 8, that is, the eighth HARQ-ACK position.

If the cell 2 is configured by a high-level signaling as the reference cell, then within the occasion 0, the HARQ-ACK corresponding to PDSCH of the cell 2 is disposed at a location of the first DAI count of the counter DAI equal to 1, that is, the first HARQ-ACK position, and the HARQ-ACK corresponding to PDSCH of the cell 1 is disposed at a location of the second DAI count of the counter DAI equal to 2, that is, the second HARQ-ACK position; within the occasion 1, the HARQ-ACK corresponding to PDSCH of the cell 2 is disposed at a location of the first DAI count of the counter DAI equal to 7, that is, the seventh HARQ-ACK position, and the HARQ-ACK corresponding to PDSCH of the cell 1 is disposed at a location of the second DAI count of the counter DAI equal to 8, that is, the eighth HARQ-ACK position.

It should be noted that the above-described n-th HARQ-ACK position may correspond to multiple bits. For example, in a case that CBG is not configured, two codewords are supported and the HARQ-ACK is not bundled, then one HARQ-ACK position occupies 2 bits. If CBG is not configured, 2 codewords are supported and the HARQ-ACK is bundled, one HARQ-ACK position occupies 1 bit. If CBG is configured, 2 codewords are supported and CBG=8, then one HARQ-ACK position occupies 8 bits.

The method according to the third embodiment provides a new method for calculating a counter DAI and a total DAI, and provides a specific solution for determining a location of an HARQ-ACK in a dynamic codebook based on the calculation method, especially a solution for feeding back, in a dynamic codebook, locations of HARQ-ACKs corresponding to PDSCHs of two cells scheduled by one DCI. The solution can simplify a high-level signaling configuration, without additional dynamic signaling interaction.

Fourth Embodiment

A method for determining a location of an HARQ-ACK in a dynamic codebook is provided in this embodiment. The method includes the following step.

In response to one DCI scheduling a PDSCH of at least one cell, a counter DAI and a total DAI are calculated according to the following equations:

the counter DAI=a counter DAI in a DCI previous to a current DCI+1, the total DAI=a total DAI in the DCI previous to the current DCI+1.

In a case that the DCI schedules a PDSCH of one cell, a counter DAI and a total DAI are calculated according to the following equations:

the counter DAI=a counter DAI in a DCI previous to a current DCI+1, the total DAI=a total DAI in the DCI previous to the current DCI+1.

The method further includes the following step. An HARQ-ACK corresponding to the PDSCH of the cell is disposed at a location of a DAI count of the counter DAI.

In a case that the DCI schedules PDSCHs of two cells and the two scheduled cells have a same CBG configuration, the counter DAI and the total DAI are calculated according to the following equations:

the counter DAI=a counter DAI in a DCI previous to a current DCI+1, the total DAI=a total DAI in the DCI previous to the current DCI+1.

The method further includes the following step. An XOR operation is performed on HARQ-ACKs corresponding to the PDSCHs of the two cells to generate an HARQ-ACK occupying one position, and the generated HARQ-ACK is disposed at a location of a DAI count of the counter DAI.

The method according to the fourth embodiment provides a new method for calculating a counter DAI and a total DAI, and provides a specific solution for determining a location of an HARQ-ACK in a dynamic codebook based on the calculation method, especially a solution for feeding back, in a dynamic codebook, locations of HARQ-ACKs corresponding to PDSCHs of two cells scheduled by one DCI. The solution can simplify a high-level signaling configuration, without additional dynamic signaling interaction.

Fifth Embodiment

Figure 6:
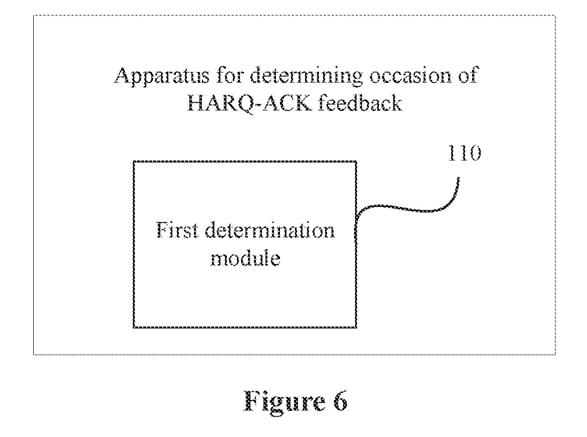
FIG. 6 is a schematic block diagram of an apparatus for determining an occasion of an HARQ-ACK feedback according to a fifth embodiment of the present disclosure.

An apparatus for determining an occasion of an HARQ-ACK feedback is provided according to the embodiment. As shown in FIG. 6, the apparatus includes a first determination module 110.

The first determination module 110 is configured to: in response to one DCI scheduling PDSCHs of more than one cell, taking a timeslot in which an end occasion of a PDSCH of one of the scheduled cells is located as a reference timeslot, calculate a timeslot in which an occasion of an HARQ-ACK feedback is located according to the following equation:

the timeslot in which the occasion of the HARQ-ACK feedback is located=$n+k$.

In the above equation, n represents the reference timeslot, and k represents a timeslot offset, indicated in the DCI, between the timeslot in which the occasion of the HARQ-ACK feedback is located and the reference timeslot.

As an example, a total quantity of the cells scheduled by the DCI may be two.

In a first situation of the fifth embodiment, the reference timeslot may be a timeslot in which an end occasion of a PDSCH of a cell with a smallest serving cell ID among the scheduled cells is located.

In a second situation of the fifth embodiment, the reference timeslot may be a timeslot in which an end occasion of a PDSCH of a cell with a smallest carrier indicator flag among the scheduled cells is located.

In a third situation of the fifth embodiment, the reference timeslot may be a timeslot in which an end occasion of a PDSCH of a cell configured by a high-level signaling as a reference cell among the scheduled cells is located.

In a fourth situation of the fifth embodiment, the reference timeslot may be: a timeslot in which an end occasion of a PDSCH ending latest among PDSCHs of the scheduled cells is located, in a case that end occasions of the PDSCHs of the scheduled cells are located at different timeslots, or a timeslot in which an end occasion of PDSCHs ending simultaneously among the PDSCHs of the schedules cells is located, in a case that end occasions of the PDSCHs of the scheduled cells are located at a same timeslot.

The apparatus in the above embodiment cures the deficiency in the conventional technology that an occasion of an HARQ-ACK feedback cannot be determined in a case that one DCI schedules PDSCHs of more than one cell, and can support that one PUCCH simultaneously feed back multiple HARQ-ACKs corresponding to more than one PDSCH scheduled by one DCI.

Sixth Embodiment

Figure 7:
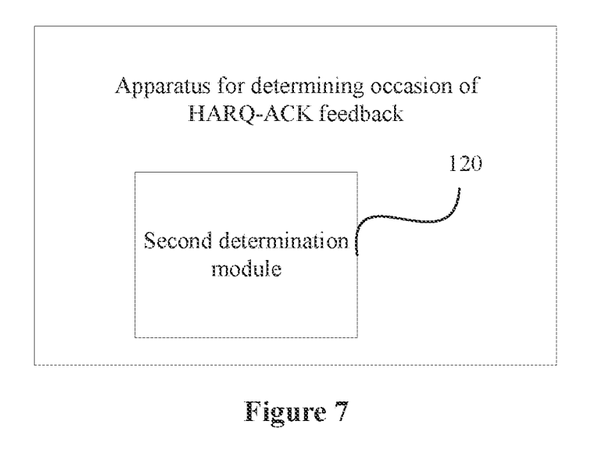
FIG. 7 is a schematic block diagram of an apparatus for determining an occasion of an HARQ-ACK feedback according to a sixth embodiment of the present disclosure.

An apparatus for determining an occasion of an HARQ-ACK feedback is provided in this embodiment. As shown in FIG. 7, the apparatus includes a second determination module 120.

The second determination module 120 is configured to: in response to one DCI scheduling PDSCHs of more than one cell, calculate, for each cell, a timeslot in which an occasion of an HARQ-ACK feedback corresponding to a PDSCH of the cell is located according to the following equation:

the timeslot in which the occasion of the HARQ-ACK feedback is located=$n_i+k$.

In the above equation, $n_i$ represents a timeslot in which an end occasion of a PDSCH of an i-th cell is located, and k represents a timeslot offset, indicated in the DCI, between the timeslot in which the occasion of the HARQ-ACK feedback is located and a timeslot in which an end occasion of a PDSCH corresponding to the HARQ-ACK feedback is located, where i is a positive integer less than or equal to a total quantity of the cells scheduled by the DCI.

As an example, the total quantity of the cells scheduled by the DCI is 2.

The apparatus in the above embodiment cures the deficiency in the conventional technology that an occasion of an HARQ-ACK feedback cannot be determined in a case that one DCI schedules PDSCHs of more than one cell, and can support that one PUCCH simultaneously feed back multiple HARQ-ACKs corresponding to more than one PDSCH scheduled by one DCI.

Seventh Embodiment

Figure 8:
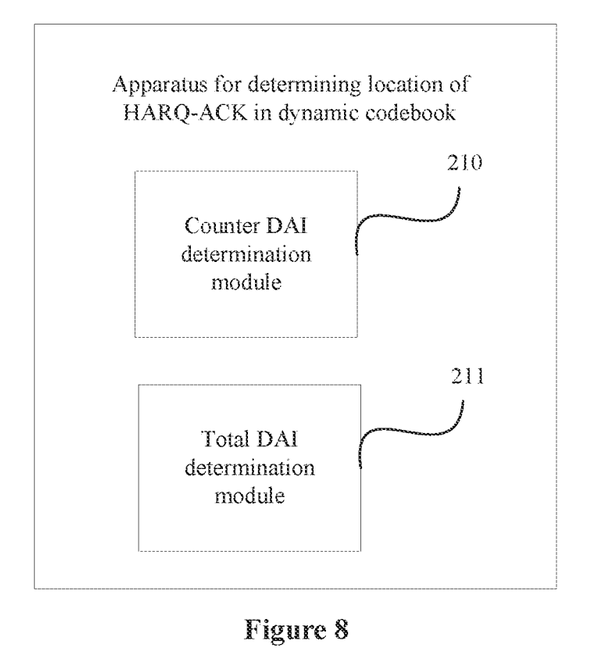
FIG. 8 is a schematic block diagram of an apparatus for determining a location of an HARQ-ACK in a dynamic codebook according to a seventh embodiment of the present disclosure.

An apparatus for determining a location of an HARQ-ACK in a dynamic codebook is provided in this embodiment. As shown in FIG. 8, the apparatus includes: a counter DAI determination module 210 and a total DAI determination module 211.

The counter DAI determination module 210 is configured to: in response to one DCI scheduling a PDSCH of at least one cell, calculate a counter DAI according to the following equation:

the counter DAI=a counter DAI in a DCI previous to a current DCI+a total quantity of the scheduled cells.

The total DAI determination module 211 is configured to: in response to the DCI scheduling a PDSCH of at least one cell, calculate a total DAI according to the following equation:

a total DAI=a total DAI in the DCI previous to the current DCI+the total quantity of the scheduled cells.

In a case that the DCI schedules a PDSCH of one cell, then the counter DAI and the total DAI are calculated according to the following equations:

the counter DAI=a counter DAI in a DCI previous to a current DCI+1;

the total DAI=a total DAI in the DCI previous to the current DCI+1.

The counter DAI determination module 210 is further configured to dispose an HARQ-ACK corresponding to the PDSCH of the cell at a location of a DAI count in the counter DAI.

In a case that the DCI schedules PDSCHs of more than one cell, the count DAI determination module 210 is further configured to: sort the scheduled cells according to a preset rule, and dispose HARQ-ACKs corresponding to the PDSCHs of the sorted cells at locations of DAI counts sequentially from a first DAI count to a last DAI count in the counter DAI, respectively.

The preset rules may include:
the scheduled cells are sorted according to serving cell IDs of the cells from small to large; or
the scheduled cells are sorted according to carrier indicator flags of the cells from small to large; or
a reference cell configured by a high-level signaling is given priority, which means the cell configured by a high-level signaling as the reference cell is at the first place.

In an example, the scheduled cells may have a same CBG configuration.

In an example, a total quantity of the cells scheduled by the DCI may be 2.

If the DCI schedules PDSCHs of two cells, and the scheduled two cells have a same CBG configuration, then the counter DAI and the total DAI may be calculated according to the following equations:

the counter DAI=a counter DAI in a DCI previous to a current DCI+2;

the total DAI=a total DAI in the DCI previous to the current DCI+2.

In this case, the counter DAI determination module 210 sorts the scheduled cells according to the preset rule, and disposes HARQ-ACKs corresponding to the PDSCHs of the sorted cells at locations of DAI counts sequentially from the first DAI count to the last DAI count in the counter DAI, respectively. Specific cases are described as follows.

In a first case, the scheduled cells are sored according to serving cell IDs of the cells from small to large. Specifically, the counter DAI determination module 210 is configured to dispose an HARQ-ACK corresponding to a PDSCH of a cell with a smaller serving cell ID in the two cells at a location of the first DAI count in the counter DAI, and dispose an HARQ-ACK corresponding to a PDSCH of a cell with a larger serving cell ID in the two cells at a location of the second DAI count in the counter DAI.

Alternatively, in a second case, the scheduled cells are sored according to carrier indicator flags of the cells from small to large. Specifically, the counter DAI determination module 210 is configured to dispose an HARQ-ACK corresponding to a PDSCH of a cell with a smaller carrier indicator flag in the two cells at a location of the first DAI count in the counter DAI, and dispose an HARQ-ACK corresponding to a PDSCH of a cell with a larger carrier indicator flag at a location of the second DAI count in the counter DAI.

Alternatively, in a third case, a reference cell configured by a high-level signaling is given priority. Specifically, the counter DAI determination module 210 is configured to dispose an HARQ-ACK corresponding to a PDSCH of a cell configured by the high-level signaling as the reference cell in the two cells at a location of the first DAI count in the counter DAI, and dispose an HARQ-ACK corresponding to a PDSCH of a cell not configured by the high-level signaling as the reference cell in the two cells at a location of the second DAI count in the counter DAI. The high-level signaling may include an RRC signaling.

The apparatus according to the seventh embodiment provides a new method for calculating a counter DAI and a total DAI, and provides a specific solution for determining a location of an HARQ-ACK in a dynamic codebook based on the calculation method, especially a solution for feeding back, in a dynamic codebook, locations of HARQ-ACKs corresponding to PDSCHs of two cells scheduled by one DCI. The solution can simplify a high-level signaling configuration, without additional dynamic signaling interaction.

Eighth Embodiment

Figure 9:
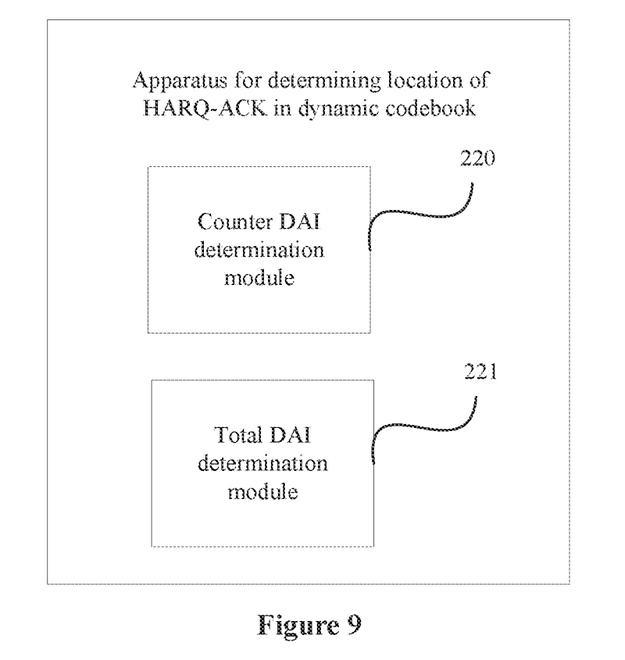
FIG. 9 is a schematic block diagram of an apparatus for determining a location of an HARQ-ACK in a dynamic codebook according to an eighth embodiment of the present disclosure.

An apparatus for determining a location of an HARQ-ACK in a dynamic codebook is provided in the embodiment. As shown in FIG. 9, the apparatus includes a counter DAI determination module 220 and a total DAI determination module 221.

The counter DAI determination module 220 is configured to: in response to one DCI scheduling a PDSCH of at least one cell, calculate a counter DAI according to the following equation:

the counter DAI=a counter DAI in a DCI previous to a current DCI+1.

The total DAI determination module 221 is configured to: in response to the DCI scheduling a PDSCH of at least one cell, calculate a total DAI according to the following equation:

the total DAI=a total DAI in the DCI previous to the current DCI+1.

In a case that the DCI schedules a PDSCH of one cell, the counter DAI and the total DAI are calculated according to the following equations:

the counter DAI=a counter DAI in a DCI previous to a current DCI+1, the total DAI=a total DAI in the DCI previous to the current DCI+1.

In a case that the DCI schedules the PDSCH of one cell, the counter DAI determination module 220 is further configured to dispose an HARQ-ACK corresponding to the PDSCH of the cell at a location of a DAI count of the counter DAI.

In a case that the DCI schedules PDSCHs of two cells and the two scheduled cells have a same CBG configuration, the counter DAI and the total DAI are calculated according to the following equations:

the counter DAI=a counter DAI in a DCI previous to a current DCI+1, the total DAI=a total DAI in the DCI previous to the current DCI+1.

The counter DAI determination module 220 is further configured to perform an XOR operation on HARQ-ACKs corresponding to the PDSCHs of the two cells to generate an HARQ-ACK occupying one position, and dispose the generated HARQ-ACK at a location of a DAI count of the counter DAI.

The apparatus according to the eighth embodiment provides a new method for calculating a counter DAI and a total DAI, and provides a specific solution for determining a location of an HARQ-ACK in a dynamic codebook based on the calculation method, especially a solution for feeding back, in a dynamic codebook, locations of HARQ-ACKs corresponding to PDSCHs of two cells scheduled by one DCI. The solution can simplify a high-level signaling configuration, without additional dynamic signaling interaction.

Ninth Embodiment

User equipment is provided in the embodiment. The user equipment is configured to: provide an HARQ-ACK feedback at a timeslot in which an occasion of the HARQ-ACK feedback is located. The timeslot is calculated through the method described in the first embodiment 1 or second embodiment or through the apparatus described in the fifth embodiment or sixth embodiment; and/or, The user equipment is configured to transmit an HARQ-ACK, the HARQ-ACK is located in a dynamic codebook at a location determined through the method described in the third embodiment or fourth embodiment or through the apparatus described in the seventh embodiment or eighth embodiment.

Tenth Embodiment

Figure 10:
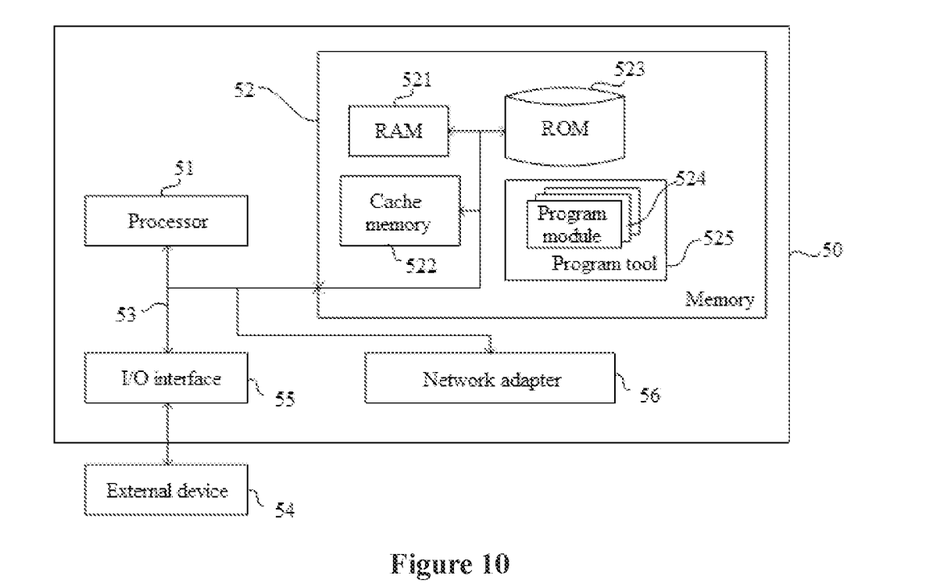
FIG. 10 is a schematic structural diagram of an electronic device according to a tenth embodiment of the present disclosure.

FIG. 10 is a schematic structural diagram of an electronic device according to the tenth embodiment of the present disclosure. The electronic device includes a memory, a processor, and a computer program stored in the memory and executable on the processor. The processor, when executing the computer program, implements the method described in any of the first to fourth embodiments. The electronic device 50 shown in FIG. 10 is merely an example, which should not serve as any limitation on the function and application scope of embodiments of the present disclosure.

As shown in FIG. 10, the electronic device 50 may be a general-purpose computing device, such as a server device. Components of the electronic device 50 may include, but are not limited to, at least one processor 51, at least one memory 52, and a bus 53 connecting different system components (including the memory 52 and the processor 51).

The bus 53 includes a data bus, an address bus, and a control bus.

The memory 52 may include a volatile memory, such as a random access memory (RAM) 521 and/or a cache memory 522, and may further include a read only memory (ROM) 523.

The memory 52 may further include a program/practical tool 525 having a set of program modules 525 (at least one program module). The program module 524 includes, but is not limited to, an operation system, one or more application programs, other program modules and program data, and each one or combination of these examples may be used for an implementation of a network environment.

The processor 51 executes the computer program stored in the memory 52, so as to perform various functional applications and data processing, such as the method described in any one of the first to fourth embodiments of the present disclosure.

The electronic device 50 may communicate with at least one external device 54 (such as a keyboard, a pointing device). Such communication may be performed via an input/output (I/O) interface 55. The model-generating device 50 may communicate with one or more networks (for example, a local area network (LAN), a wide area network (WAN), and/or a public network such as the Internet) through a network adapter 56. As shown in FIG. 10, the network adapter 56 communicates with other modules of the model-generating device 50 via the bus 53. It should be understood that, although not shown, other hardware and/or software module may be used in conjunction with the model-generating device 50. The hardware and/or software module includes, but is not limited to microcode, device driver, redundant processor, external disk drive array, redundant arrays of independent disks (RAID) system, tape drive, and data backup storage system.

It should be noted that although mentioned in the above detailed description, the units/modules or sub-units/modules of the electronic device are merely exemplary but not mandatory. According to embodiments of the present disclosure, features and functions of two or more of the units/modules described above may be embodied in one unit/module. Alternatively, features and functions of one of the units/modules described above may be further subdivided to multiple units/modules.

Eleventh Embodiment

A computer-readable storage medium storing a computer program is further provided in an embodiment. The program, when executed by a processor, causes steps of the method described in any of the first to fourth embodiments to be implemented.

The readable storage medium may include, but is not limited to, a portable disk, a hard disk, a random access memory, a read-only memory, an erasable programmable read-only memory, an optical storage device, a magnetic storage device, or a combination thereof.

In a possible implementation, the present disclosure may be implemented in a form of a program product including program codes. When the program product is executed on a terminal device, the program codes cause the terminal device to implement steps of the method described in any of the first to fourth embodiment.

The program codes for implementing the present disclosure may be written in one programming language or in any combination of more programming languages. The program codes may be fully executed on the user equipment, or partially executed on the user equipment, or executed as a standalone software package, or partially executed on the user equipment and partially executed on a remote device, or fully executed on the remote device.

Although the specific embodiments of the present disclosure are described above, those skilled in the art should understand that the embodiments are merely illustrative, and the protection scope of the present disclosure is defined by the appended claims. Various changes or modifications may be made to the embodiments by those skilled in the art without departing from the principle and essence of the present disclosure, and the changes and modifications shall fall within the protection scope of the present disclosure.

The invention claimed is:

1. A method for determining an occasion of a hybrid automatic repeat request-ACK (HARQ-ACK) feedback, comprising:
in response to one downlink control information (DCI) scheduling physical downlink shared channels (PDSCH) of more than one cell, taking a timeslot in which an end occasion of a PDSCH of one of the scheduled cells is located as a reference timeslot, calculating a timeslot in which an occasion of an HARQ-ACK feedback is located according to the following equation:

the timeslot in which the occasion of the HARQ-ACK feedback is located=$n+k$, wherein n represents the reference timeslot, and k represents a timeslot offset, indicated in the DCI, between the timeslot in which the occasion of the HARQ-ACK feedback is located and the reference timeslot;

wherein the reference timeslot is a timeslot in which an end occasion of a PDSCH ending latest among PDSCHs of the scheduled cells is located, in a case that end occasions of the PDSCHs of the scheduled cells are located at different timeslots.

2. The method according to claim 1, wherein the reference timeslot is:
a timeslot in which an end occasion of PDSCHs ending simultaneously among the PDSCHs of the schedules cells is located, in a case that end occasions of the PDSCHs of the scheduled cells are located at a same timeslot.

3. The method according to claim 1, wherein a total quantity of the cells scheduled by the DCI is two.

4. An apparatus for determining an occasion of a hybrid automatic repeat request-ACK (HARQ-ACK) feedback, comprising a processor and a non-transitory memory storing computer programs,
wherein the processor, when executing the computer programs, is configured to:
in response to one downlink control information (DCI) scheduling physical downlink shared channels (PDSCH) of more than one cell, taking a timeslot in which an end occasion of a PDSCH of one of the scheduled cells is located as a reference timeslot, calculate a timeslot in which an occasion of an HARQ-ACK feedback is located according to the following equation:

the timeslot in which the occasion of the HARQ-ACK feedback is located=$n+k$, wherein n represents the reference timeslot, and k represents a timeslot offset, indicated in the DCI, between the timeslot in which the occasion of the HARQ-ACK feedback is located and the reference timeslot;

wherein the reference timeslot is a timeslot in which an end occasion of a PDSCH ending latest among PDSCHs of the scheduled cells is located, in a case that end occasions of the PDSCHs of the scheduled cells are located at different timeslots.

5. The apparatus according to claim 4, wherein the reference timeslot is:
a timeslot in which an end occasion of PDSCHs ending simultaneously among the PDSCHs of the schedules cells is located, in a case that end occasions of the PDSCHs of the scheduled cells are located at a same timeslot.

6. The apparatus according to claim 4, wherein a total quantity of the cells scheduled by the DCI is two.

7. An electronic device, comprising:
a memory;
a processor; and
a computer program stored in the memory and executable on the processor,
wherein the processor, when executing the computer program, implements the method according to claim 1.

8. A non-transitory computer-readable storage medium storing a computer program, wherein the computer program, when executed by a processor, causes steps of the method according to claim 1 to be implemented.

* * * * *